(12) United States Patent
Gutendorf et al.

(10) Patent No.: US 6,601,907 B2
(45) Date of Patent: Aug. 5, 2003

(54) DEVICE FOR DETERMINING AN ANGULAR POSITION

(75) Inventors: Peter Gutendorf, Osnabrueck (DE); Dieter Rethschulte, Lengerich (DE); Guntram Knobloch, Osnabrueck (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/947,830

(22) Filed: Sep. 6, 2001

(65) Prior Publication Data
US 2002/0079720 A1 Jun. 27, 2002

(30) Foreign Application Priority Data
Sep. 23, 2000 (DE) ...................................... 200 16 498 U

(51) Int. Cl.$^7$ .................................................. B60J 7/12
(52) U.S. Cl. .................................. 296/122; 296/107.09
(58) Field of Search ...................... 296/107.01, 107.09, 296/116, 118, 121, 122

(56) References Cited

U.S. PATENT DOCUMENTS

| | | | | | |
|---|---|---|---|---|---|
| 4,491,918 | A | * | 1/1985 | Yuki et al. | 364/424 |
| 5,225,747 | A | * | 7/1993 | Helms et al. | 318/265 |
| 6,054,821 | A | * | 4/2000 | Koch et al. | 318/266 |
| 6,273,492 | B1 | * | 8/2001 | Schroder et al. | 296/107.01 |

* cited by examiner

*Primary Examiner*—Dennis H. Pedder
(74) *Attorney, Agent, or Firm*—Jordan and Hamburg LLP

(57) ABSTRACT

A device for determining an angular position of parts of a convertible roof, which can be swiveled relative one another has an electrical or electronic determining instrument with a housing connected to a first part of the folding top, and a controller member, which can be rotated to relative to the first part of the folding top, connected to a second part of the folding top, which can be swiveled relative to the first part. A connection of the housing to the first part of the folding top of and/or a connection the controller member to the second part is constructed as a movable connection.

15 Claims, 3 Drawing Sheets

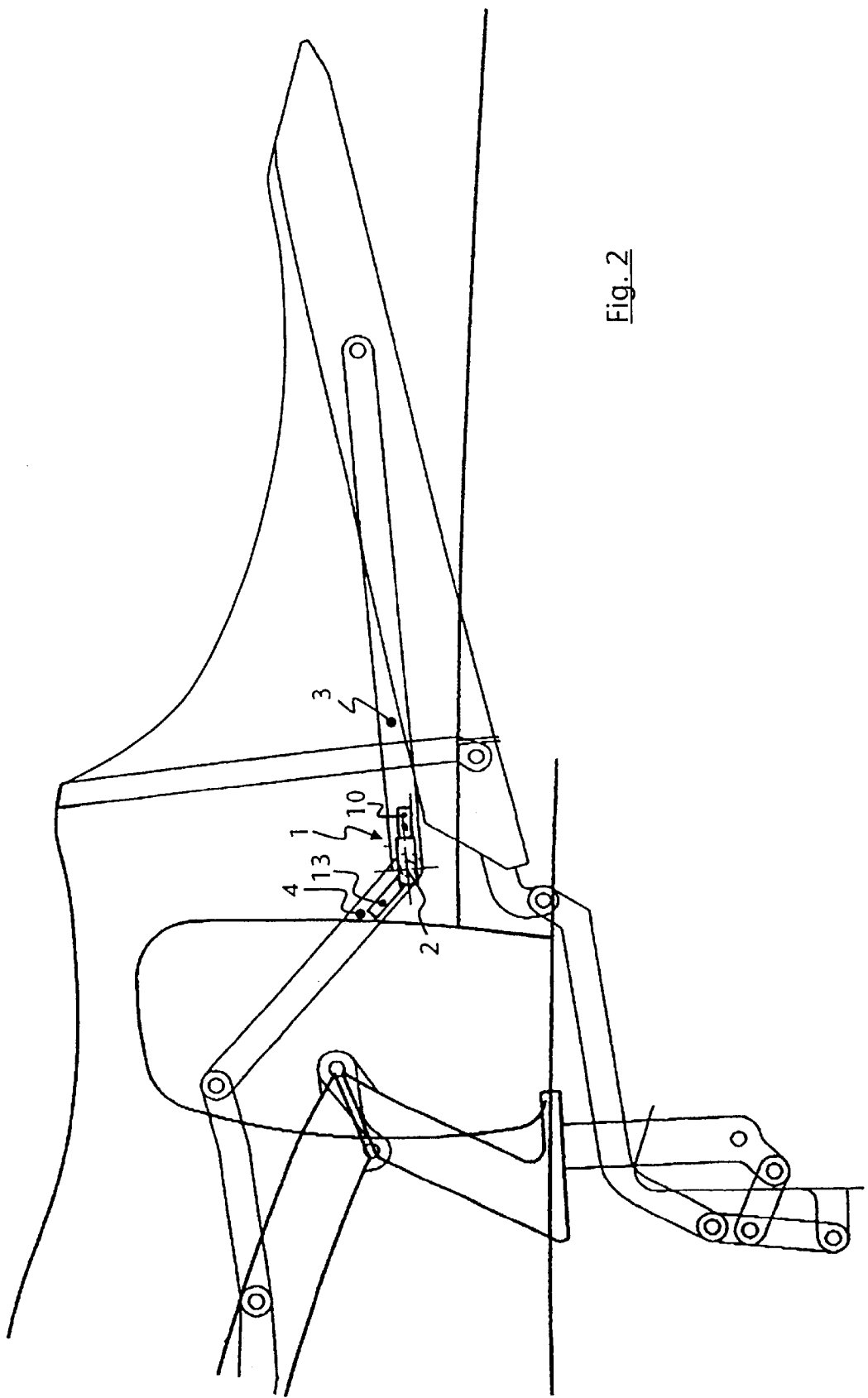

Figure 1:
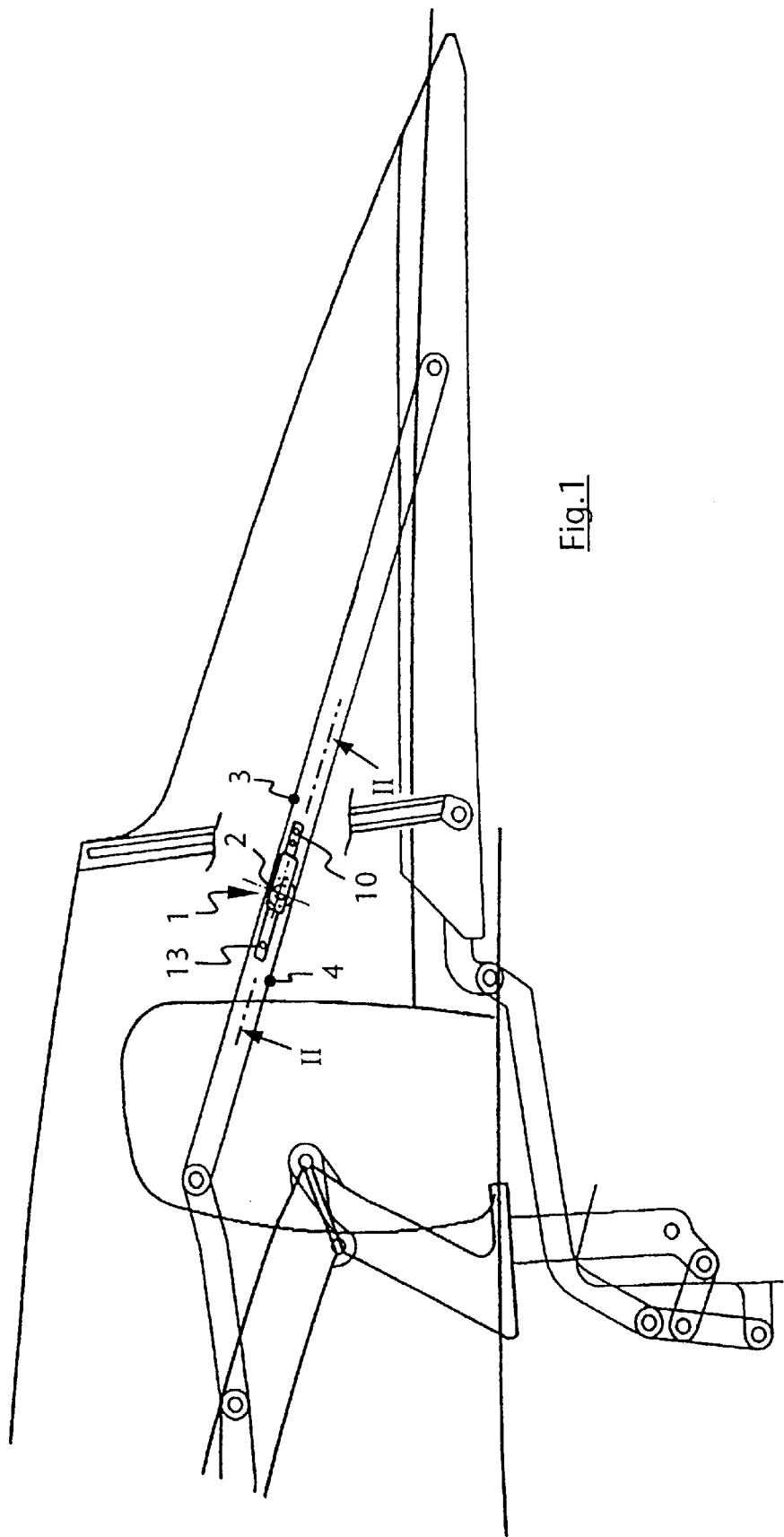

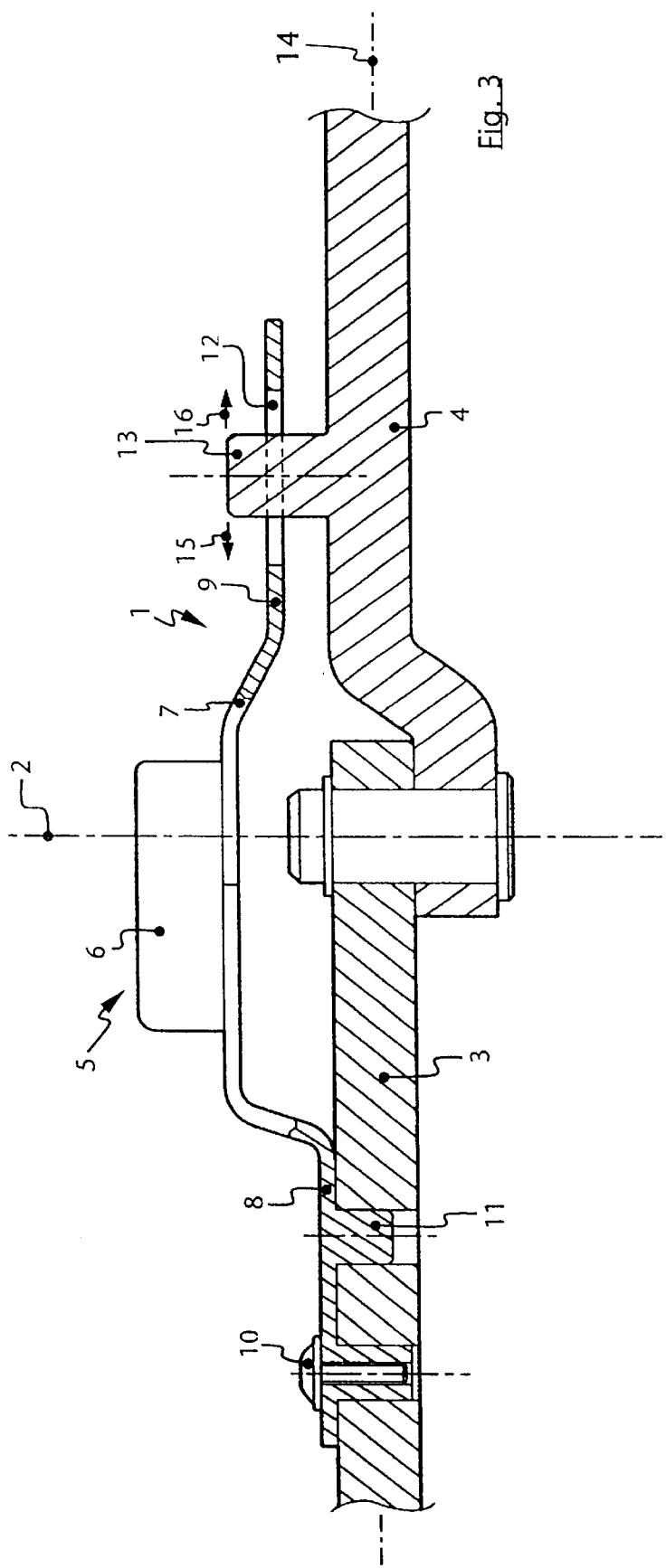
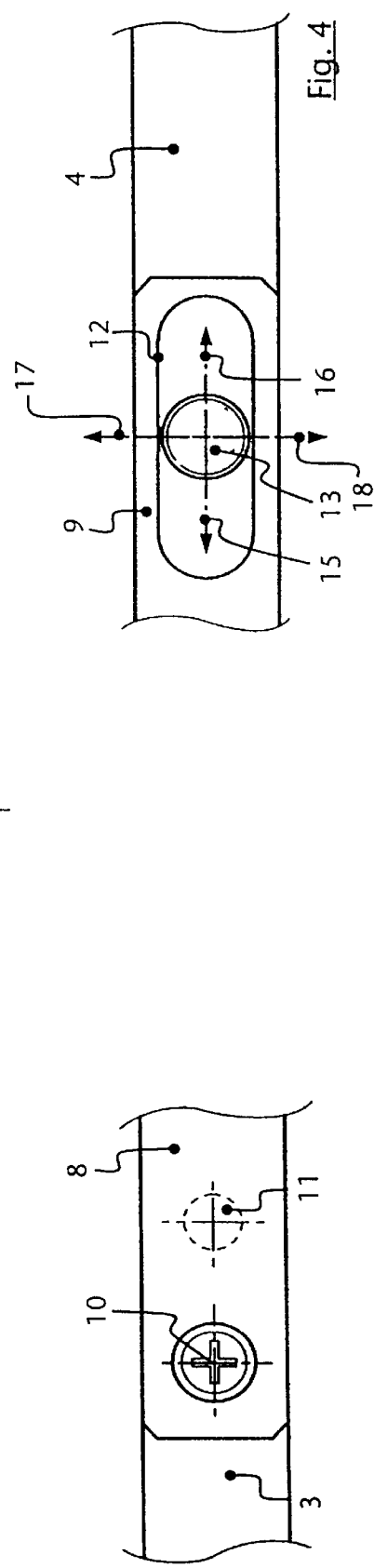

DEVICE FOR DETERMINING AN ANGULAR POSITION

BACKGROUND OF THE INVENTION

The invention relates to a device for determining an angular position of parts of a convertible roof which can be swiveled against one another.

A flexibly constructed convertible roof has a supporting structure with links, which can be swiveled relative one another in the side region of the roof and of which one may be immobile with regard to the body of the vehicle or both of which may be movable with respect to the body of the vehicle. Mechanical links or similar control or driving agents, by means of which the roof can be opened or closed, are also disposed in the side region of a roof, which comprises partially or completely rigid roof parts.

It is desirable to determine the instantaneous position of the roof in its opening and closing movement or also in its end position, in order to obtain input data for exact course of control of the roof movement by means of this information. By these means, an exact synchronization of the driving mechanisms, assigned to the sides of the vehicle, can be accomplished. By means of the input data, the course of motion can be adjusted instead of strictly controlled. For this purpose, the determination of the angular position of parts of a roof, which can be swiveled against one another, is known.

Especially in the case of textile convertible roofs, the links supporting the folding roof may twist, so that there are not only strictly swiveling motions of these links with respect to one another, but also components of motion, acting transversely thereto during the opening and closing of the roof. As a result, it is more difficult to dispose angle-measuring instruments, which are connected at one end with one link and at the other end with the link, which can be swiveled with respect to the first link. The mutually moving parts may tilt and the electrically conducting annular contact surface of a variable potentiometer, for example, may be damaged. Moreover, the accuracy of the measurement is affected. It is an object of the invention to provide an improvement thereof.

SUMMARY OF THE INVENTION

The present invention provides a detecting device wherein mobility of a connection between a folding top part and and a controller member or a housing is effected such that interfering moving components of pivotable parts of the folding top can be intercepted without affecting the device.

When a variable potentiometer is used to measure an angular position, an inexpensive detection possibility is created, which can be realized with standard, serial components.

If a cantilever arm extends particularly advantageously from the housing as well as from a controller member in the direction of the folding top link, the latter can be connected simply at its outwardly pointing end with the link.

Particularly advantageously for the accuracy of the measurement and for the mechanically secure holding of the detection instrument, one connection is constructed movably and another (the housing or the controller member) is constructed immovably.

To compensate for tolerances, it is particularly advantageous if the connection is movable in the longitudinal extent of the pivotable part and transversely to the plane of pivoting. This can be realized easily, for example, over a peg, which can be guided in a sliding-blockguide.

Further advantages and details arise out of an example of the object of the invention which is described in the following and shown in the accompanying drawings.

IN THE DRAWINGS

FIG. 1 shows a diagrammatic representation of a convertible vehicle with a device of the present invention with aligned orientation of mutually pivotable parts, FIG. 2 shows a representation, similar to that of FIG. 1, of an angular orientation of the mutually pivotable parts, FIG. 3 shows a section along the line II—II in FIG. 1, and FIG. 4 shows a plan view of the device of FIG. 2, truncated in the middle region.

DESCRIPTION OF THE PREFERRED EMBODIMENTS

Referring to FIGS. 1–4, an embodiment of the present invention provides a device 1 which determines the angular position of two parts 3, 4, which can be mutually pivoted about a swiveling axis 2 and are connected to a folding top. For this purpose, a variable potentiometer 5 is provided which comprises a housing 6 and a controller member 7, which can be rotated therein. Instead of a variable potentiometer 5, other electrical or electronic detection instruments also come into consideration, such as an optical detection device, equipped with a light-emitting diode, an expanding, annular sliding-blockguide and mutually opposite photoelectric cells. A strictly mechanical angle-measuring device is also possible.

The housing 6 is connected via a first cantilever arm 8 and the controller member 7 over a second cantilever arm 9 with the part 3 or 4, which are links. Parts 3, 4, as well as the cantilever arms 8, 9 may consist of a suitable solid material, such as steel. By swiveling the parts 3 and 4 relative one another about a swiveling axis 2, the cantilever arms 8, 9 are carried along, as a result of which there is relative movement between the controller member 7 and the housing 6 of the variable potentiometer 5 and, with that, there is a change in an electrical signal, which gives a measure of the angle between the parts 3, 4. The cantilever arm 8 of the housing 6 is connected immovably by screws 10 as well as a boss 11, which prevents rotation, with the link 3 at the folding top. On the other hand, the cantilever arm 9 of the controller member 7 is connected movably with the second link 4.

Conversely, instead of this allocation, the controller member 7 may also be connected movable and the housing 6 movably with the parts 4, 3. Under special conditions, the controller member 7 as well as the housing 6 can be connected movably with the respective parts 4, 3. In the latter case, at the very least, a danger exists that the accuracy of measurement is reduced. However, this can be counteracted by an appropriate structural design.

As can be seen in FIG. 4, the cantilever arms 8, 9 are extended longitudinally and constructed to be parallel to the respective link 3, 4. In the example, the cantilever arm 9 comprises a sliding-block guide 12, which extends in the longitudinal direction of the link 4 and which is engaged by a peg 13, which is disposed on the link 4. The connection between the link 4 and the cantilever arm 9 therefore is movable in the direction of the longitudinal extent of the link 4 (in the direction of the arrows 15, 16). Moreover, it is movable transversely to the swiveling plane 14, that is, in the direction approximately parallel to the swiveling axis 2.

If the sliding-blockguide 12 is overdimensioned, the cantilever arm 9 can also be moved transversely (in the direction of arrows 17, 18) transversely to the extent of the link 4. However, this mobility must be kept small so that the angle measurement results are not distorted.

In the example, the peg 13 does not provide security against pulling off, so that even greater twisting of the parts 3 and 4 relative to one another does not lead to a force, which would tilt the controller member 7. The cantilever arm 9 can be lifted from the peg 13.

The variable potentiometer 5 used is a standard variable potentiometer, which can be used without changes and therefore ensures that the device 1 can be manufactured inexpensively.

Instead of an attachment to the links 3, 4 of a flexible folding top, an attachment to two-dimensional or voluminously extended components, which swivel against one another, also comes into consideration.

The variable potentiometer 5 is connected to a control system, for courses of movement of the roof, and supplies electrical input signals for this purpose.

What is claimed is:

1. An arrangement for determining a relative angular position of first and second parts of a folding top of a convertible roof which are pivotable relative one another about a common axis, comprising:

a detection device including a housing and a controller rotatable relative to said housing whereby the angle between the first and second parts is related to the degree of rotation of said controller relative to said housing;

first coupling means for coupling said housing to the first part; and second coupling means for coupling said controller to the second part;

at least one of said first and second coupling means comprising a movable coupling and a coupling arm connected to said detection device;

the movable coupling permitting relative movement of said coupling arm and a respective one of said first and second parts in a direction parallel to a longitudinal direction of said one of said first and second parts and perpendicular to said common axis;

the movable coupling permitting relative movement of said coupling arm and said respective one of said first and second parts in a direction transverse to a plane of rotation of the first and second parts; and said coupling arm extending parallel to said respective one of said first and second parts.

2. The device of claim 1, wherein said detection device is a variable potentiometer such that rotation of said controller relative to said housing generates an electrical signal indicative of the angle between the first and second parts.

3. The device of claim 1, wherein said first coupling means comprise a first cantilever arm and said second coupling means comprise a second cantilever arm and said coupling arm corresponds to one of said first and second cantilever arms.

4. The device of claim 3, wherein said first cantilever arm is adapted to be parallel to and move along with the first part and said second cantilever arm is adapted to be parallel to and move along with the second part.

5. The device of claim 1, wherein said coupling arm includes a slot adapted to receive a peg of the respective one of said first or second part.

6. The device of claim 1, wherein said second coupling means comprise said movable coupling such that said controller is movable relative to the second part and said first coupling means is constructed as a fixed connection such that said housing is fixed relative to the first part.

7. The device of claim 6, wherein said first coupling means comprise a cantilever arm adapted to extend longitudinally along the first part, and a knob and screw insertable into receptacles in the first part.

8. The device of claim 6, wherein said second coupling means comprise a cantilever arm adapted to extend longitudinally along the second part and having a longitudinal slot adapted to receive a peg formed on the second part.

9. A device for determining a relative angular position of first and second parts of a folding top of a convertible roof which are pivotable about a common axis, comprising:

a detection device including a first component and a second component rotatable relative to one another whereby the angle between the first and second parts is related to the degree of relative rotation of said first and second components;

a first arm connected to said first component and movably coupled to the first part by a movable coupling;

the movable coupling permitting relative movement of said first arm and said first part in a direction parallel to a longitudinal direction of said first part and perpendicular to said common axis;

the movable coupling permitting relative movement of said first arm and said first part in a direction transverse to a plane of rotation of the first and second parts;

said first arm extending parallel to said first part; and a second arm connected to said second component and fixedly connected to the second part.

10. The device of claim 9, wherein said first component is a housing and said second component is a controller rotatable relative to said housing.

11. The device of claim 9, wherein said detection device is a variable potentiometer such that rotation of said first component relative to said second component generates an electrical signal indicative of the angle between the first and second parts.

12. The device of claim 9, wherein said first and second arms are cantilever arms.

13. The device of claim 9, wherein said second arm is adapted to extend alongside and be parallel to the second part.

14. The device of claim 9, wherein said first arm includes a slot adapted to receive a peg formed on the first part such that when said first arm moves relative to the first part, the peg moves within said slot.

15. The device of claim 9, further comprising a knob and a screw arranged on said second arm and which are insertable into receptacles in the second part.

* * * * *